(12) United States Patent
Pohanka

(10) Patent No.: US 9,104,225 B2
(45) Date of Patent: Aug. 11, 2015

(54) ACTUATING DEVICE FOR A STEERING WHEEL

(71) Applicant: Dr. Ing. h.c. F. Porsche Aktiengesellschaft, Stuttgart (DE)

(72) Inventor: Martin Pohanka, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/470,255

(22) Filed: Aug. 27, 2014

(65) Prior Publication Data

US 2015/0059509 A1  Mar. 5, 2015

(30) Foreign Application Priority Data

Aug. 28, 2013 (DE) .......................... 10 2013 109 333

(51) Int. Cl.
| | |
|---|---|
| *B60K 17/00* | (2006.01) |
| *G05G 1/01* | (2008.04) |
| *B62D 1/04* | (2006.01) |
| *F16H 59/02* | (2006.01) |
| *G05G 1/04* | (2006.01) |

(52) U.S. Cl.
CPC .. *G05G 1/01* (2013.01); *B62D 1/04* (2013.01); *B62D 1/046* (2013.01); *F16H 59/02* (2013.01); *G05G 1/04* (2013.01)

(58) Field of Classification Search
USPC ................. 180/315, 320, 336; 74/469, 743.1, 74/473.31
See application file for complete search history.

(56) References Cited

U.S. PATENT DOCUMENTS

| | | | | |
|---|---|---|---|---|
| 5,099,720 | A * | 3/1992 | Raue .............................. | 477/144 |
| 6,532,842 | B1 * | 3/2003 | Arai et al. .................. | 74/473.31 |
| 6,834,563 | B2 * | 12/2004 | Seekircher ................. | 74/336 R |
| 2004/0211283 | A1 * | 10/2004 | Ogasawara et al. ........ | 74/473.12 |
| 2007/0056793 | A1 * | 3/2007 | Yanagihara et al. .......... | 180/336 |
| 2008/0264714 | A1 * | 10/2008 | Morikawa ..................... | 180/446 |
| 2009/0171544 | A1 * | 7/2009 | Tanaka et al. ................... | 701/55 |
| 2011/0197560 | A1 * | 8/2011 | Suhara ............................ | 56/202 |
| 2014/0236441 | A1 * | 8/2014 | Sato et al. ....................... | 701/64 |
| 2014/0290399 | A1 * | 10/2014 | Fukunaga et al. ........... | 74/15.86 |

FOREIGN PATENT DOCUMENTS

| | | |
|---|---|---|
| DE | 662902 | 7/1938 |
| DE | 2843022 | 4/1980 |
| DE | 10260168 | 7/2004 |

OTHER PUBLICATIONS

German Search Report dated Jun. 10, 2014, in related Application No. DE 10 2013 109 333.7 (with partial English translation).

* cited by examiner

*Primary Examiner* — Toan To
(74) *Attorney, Agent, or Firm* — RatnerPrestia

(57) ABSTRACT

An actuating device for performing gearshifts in a transmission and for switching functional elements includes substantially two control levers which are connected to, and arranged so as to rotate conjointly with, the steering wheel. One control lever is designed as a so-called gearshift paddle and is arranged above a further control lever for the functional elements. The lower control lever is designed so as to be movable relative to the upper gearshift paddle control lever.

10 Claims, 4 Drawing Sheets

ACTUATING DEVICE FOR A STEERING WHEEL

CROSS-REFERENCE TO RELATED APPLICATIONS

This application claims priority to German Patent Application No. DE 10 2013 109 333.7, filed Aug. 28, 2013, which is incorporated by reference herein it its entirety.

FIELD OF THE INVENTION

The invention relates to an actuating device having control levers which are connected to and rotate conjointly with a steering wheel of a motor vehicle.

BACKGROUND OF THE INVENTION

DE 28 43 022 A1, which is incorporated by reference herein, has disclosed an actuating device for the operation of operating switches of a motor vehicle, wherein said operating switches are movable with the steering wheel in order that the vehicle driver's fingers remain as far as possible within the range of access to the operating switches. Furthermore, DE 662 902 B, which is incorporated by reference herein, discloses a control lever for the actuation of functional elements of a motor vehicle, such as for example high beam, horn, indicators and further functions, said control lever being fastened directly to the steering wheel.

SUMMARY OF THE INVENTION

Described herein is an actuating device on the steering wheel of a motor vehicle, which actuating device ensures that functional elements of the vehicle can be operated in a reliable manner.

According to one aspect of the invention, described herein is an actuating device having control levers which are connected to and rotate conjointly with a steering wheel of a motor vehicle, wherein one control lever is designed for performing gearshifts in a transmission and the further control lever is designed for switching functional elements of the vehicle, wherein said one control lever is designed as a gearshift paddle and is arranged above the further control lever for the functional elements, and the further control lever is connected to the gearshift paddle control lever, so as to perform a relative movement with respect thereto, in the foot region.

An advantage achieved with the invention consist in that, by means of control levers on the steering wheel, actuations for performing gearshifts in a transmission and for switching functional elements of the vehicle are made possible in a favorable manner with regard to the driver's grip. This is advantageously achieved according to aspects of the invention in that one control lever is designed as a so-called gearshift paddle and is arranged above a further control lever for the functional elements, and said further control lever can perform a relative movement with respect to the gearshift paddle control lever, for which purpose said further control lever is connected to the gearshift paddle control lever in the foot region.

Furthermore, it is provided according to aspects of the invention that the two control levers are arranged, preferably one above the other, so as to diverge in an approximately V-shaped manner below the steering wheel rim, and the lower control lever is integrated into the foot region of the upper control lever and is arranged so as to project out of said foot region. By means of this arrangement of the two control levers relative to one another on the steering wheel, said control levers are arranged so as to rotate conjointly, and thus so as to always be in the vicinity of the driver's grip as the steering wheel rotates.

Furthermore, it is provided according to aspects of the invention that the upper control lever extends, by way of its free end comprising the gearshift paddle, below the steering wheel rim of the steering wheel and approximately as far as the inner edge of the steering wheel rim, and the free end of the lower control lever extends below the steering wheel rim and as far as the steering wheel rim. It is thus ensured that a shell-like head on the end of the lower control lever is easy to reach, because the gearshift paddle is offset inward.

In order that a relative movement of the lower control lever with respect to the upper gearshift paddle control lever is possible in a simple manner, it is also provided according to aspects of the invention that the lower control lever has, in the foot region, an angled bend with respect to the upper control lever, and the free ends of the two control levers are spaced apart with a free movement space.

The lower control lever may be movable together with the upper control lever, or else the lower control lever may be arranged so as to be decoupled with respect to the upper control lever.

BRIEF DESCRIPTION OF THE DRAWINGS

An exemplary embodiment of the invention is illustrated in the drawings and will be described in more detail below.

In the drawings.

DETAILED DESCRIPTION OF THE INVENTION

Figure 1:
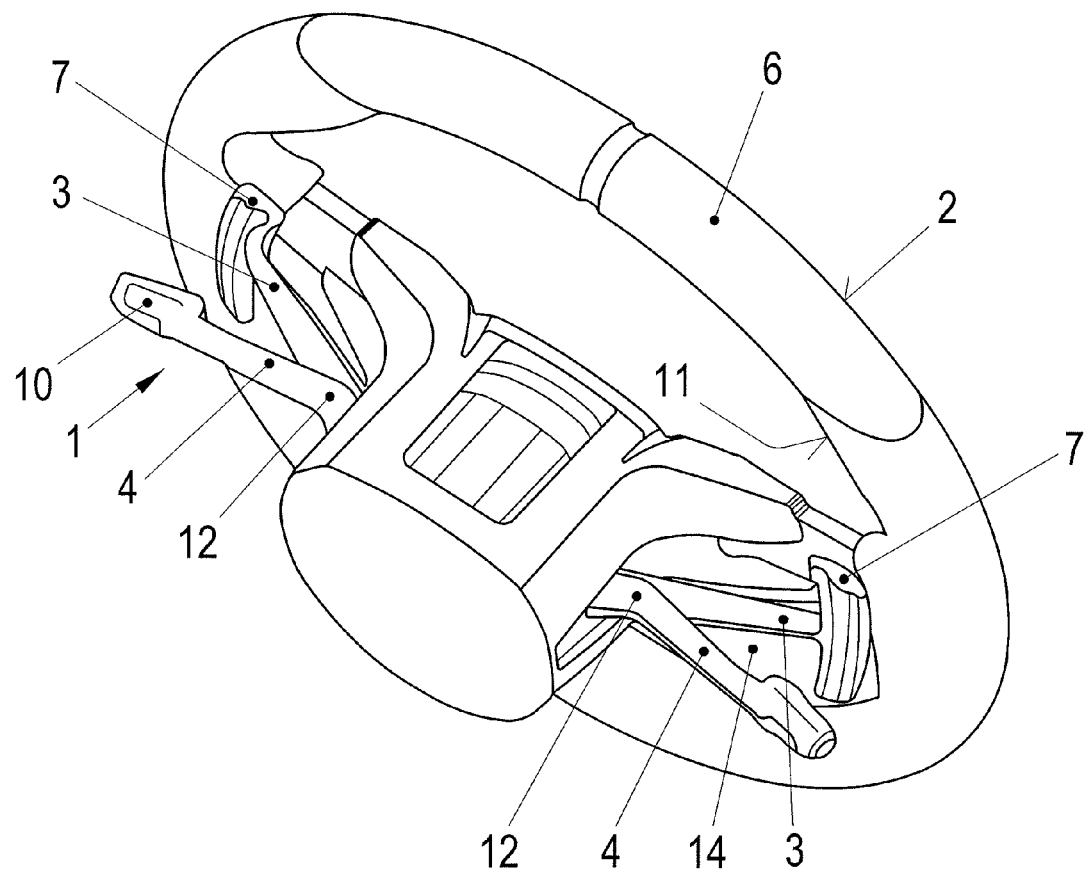
FIG. 1 is a diagrammatic illustration of a steering wheel of a motor vehicle having two control levers on each side, wherein an upper control lever is designed as a gearshift paddle and a lower control lever is designed for the actuation of functional elements.
Figure 2:
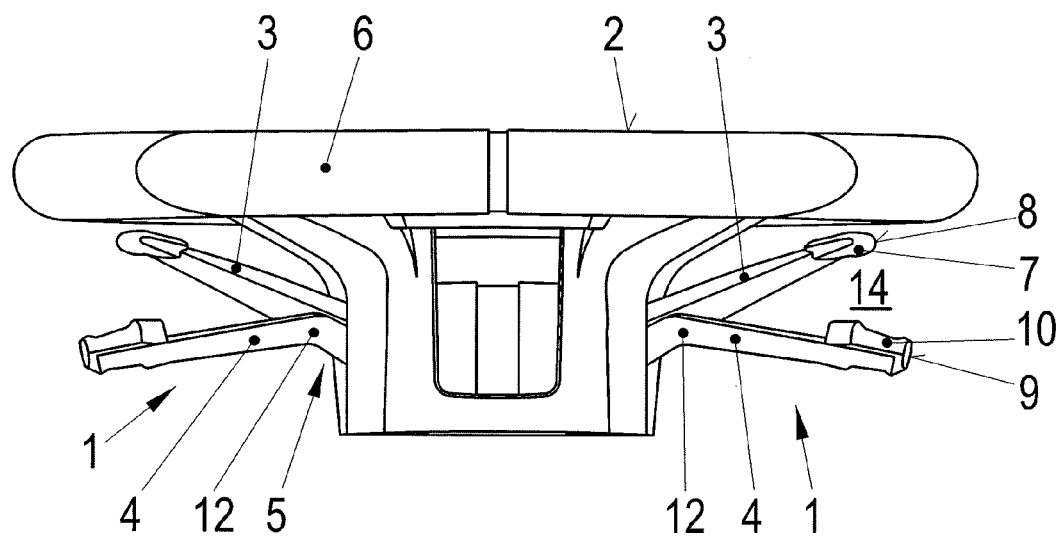
FIG. 2 shows a side view of the steering wheel with the two control levers as per FIG. 1.
Figure 3:
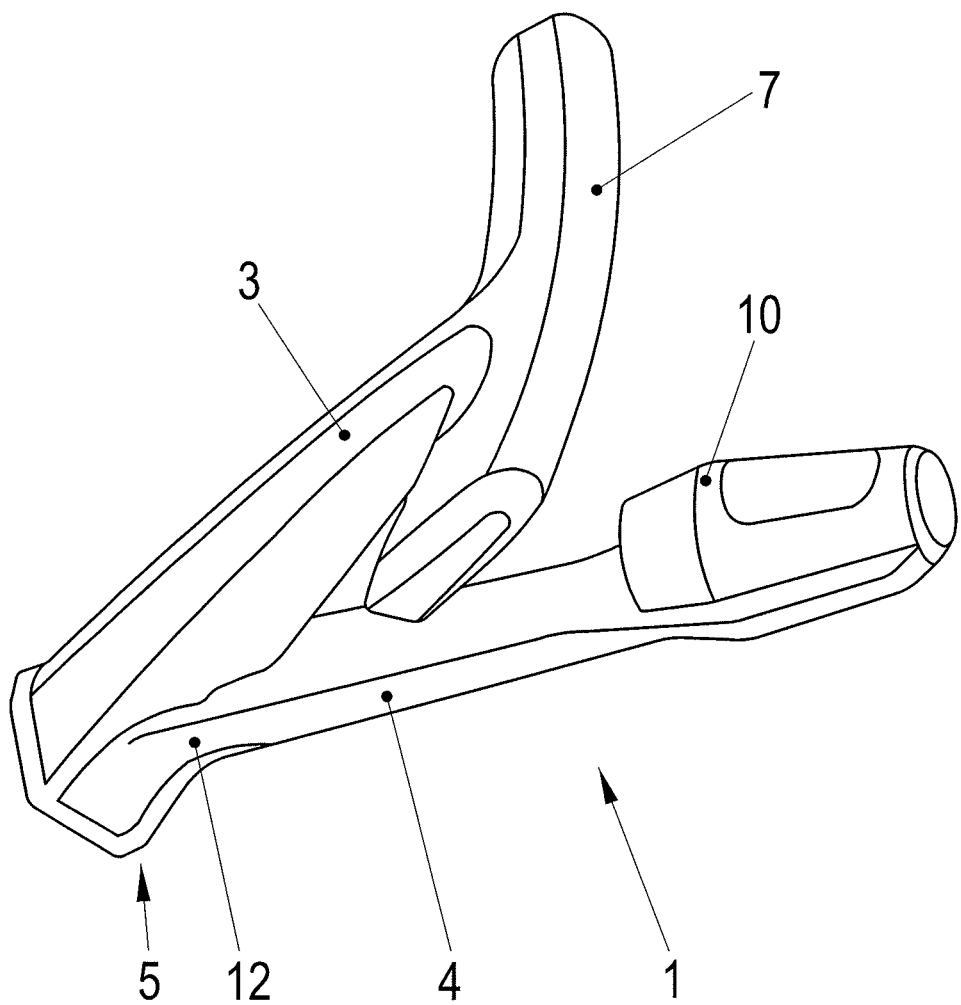
FIG. 3 is a diagrammatic detail illustration of the two control levers.
Figure 4:
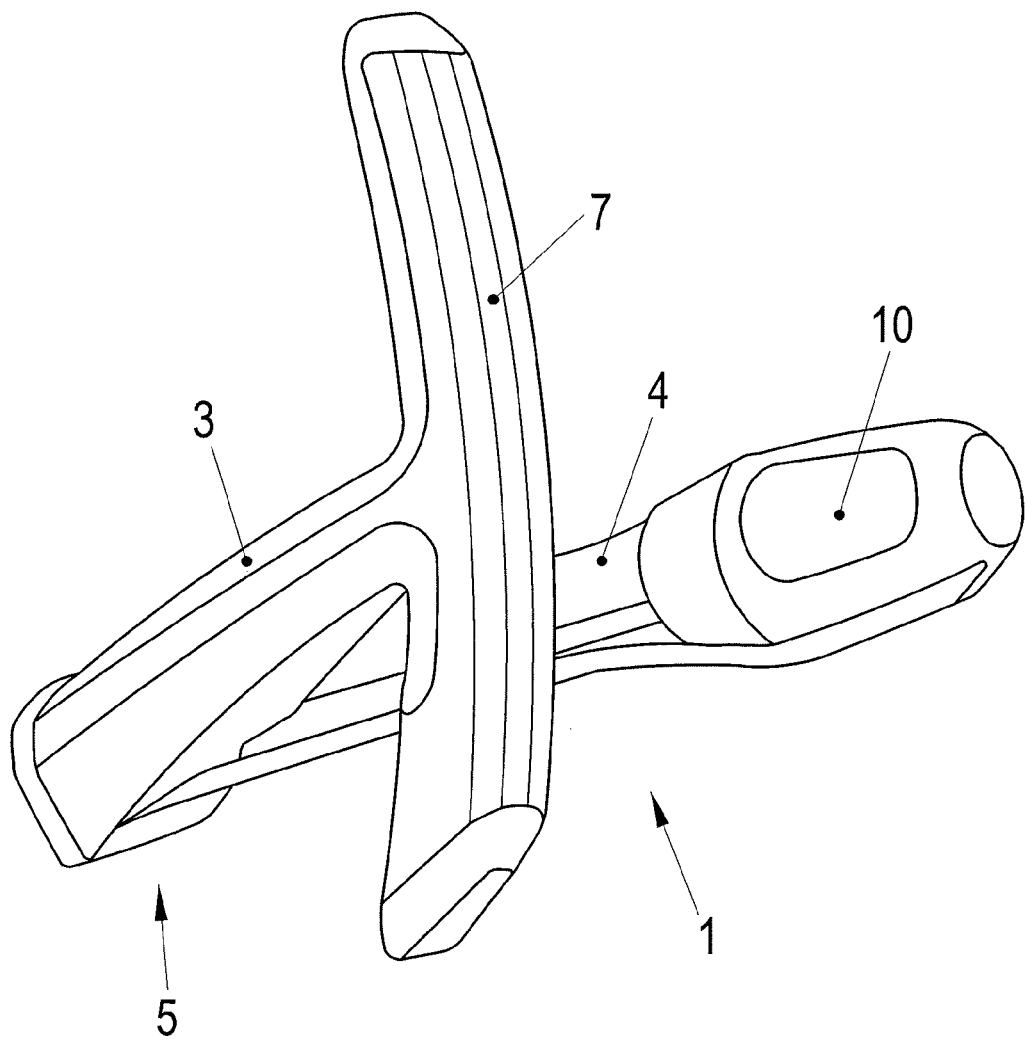
FIG. 4 shows a plan view of the two control levers as per FIG. 3.

An actuating device 1 on a steering wheel 2 for a motor vehicle comprises two control levers 3 and 4 which are connected to and rotate conjointly with the steering wheel 2. One control lever 3 serves for performing gearshifts in a transmission, and the further control lever serves for switching functional elements, such as for example lights, indicators and further functions of the vehicle. The actuating device 1 with the two control levers 3 and 4 is preferably arranged on each side of the steering wheel 2, and in each case only one side will be described.

Said one control lever 3 is designed as a so-called gearshift paddle 7 and is arranged above the further control lever 4.

The lower control lever 4 is arranged relative to the gearshift paddle control lever 3 such that a relative movement of said control lever 4 with respect to the control lever 3 is possible. For this purpose, the lower control lever 4 is correspondingly mounted in the foot region 5 of the upper control lever 3 such that a movement capability is realized.

The two control levers 3 and 4 are arranged below the steering wheel rim 6 of the steering wheel 2 and are preferably situated one above the other so as to diverge in an approximately V-shaped manner. The lower control lever 4 is integrated, by way of its end remote from the free end 9, into the foot region 5 of the upper control lever 3 and, as it were, projects out of said foot region.

The upper control lever 3 is situated with its free end 8, which comprises the gearshift paddle 7, below the steering wheel rim 6 and extends approximately as far as the inner edge 11 of the steering wheel rim 6 of the steering wheel 2. The free end 9 of the lower control lever 4, on the end of which a functional switch 10 is arranged, extends below the steering wheel rim 6 of the steering wheel 2 and as far as the steering wheel rim 6, and thus the free ends 8 and 9 of the control levers 3 and 4 are offset with respect to one another.

The lower control lever 4 is provided, in the foot region 5, with an angled bend 12 with respect to the upper gearshift paddle control lever 3, such that a free movement space 14 is formed between the two control levers 3 and 4, and the lower control lever 4 is designed to be movable with respect to the upper control lever 3.

The lower control lever 4 may be movable together with the upper gearshift paddle control lever 3, or it is also possible for the lower control lever 4 to be able to be decoupled with respect to the upper gearshift paddle control lever 4. The embodiments may be selected in accordance with the circumstances.

What is claimed is:

1. An actuating device having two control levers which are connected to and rotate conjointly with a steering wheel of a motor vehicle, wherein a first control lever of the two control levers is configured for performing gearshifts in a transmission and a second control lever of the two control levers is configured for switching functional elements of the vehicle, wherein the first control lever is configured as a gearshift paddle and is arranged above the second control lever for the functional elements, and the second control lever is connected to the first control lever so as to perform a relative movement with respect thereto in a foot region of the actuating device.

2. The actuating device as claimed in claim 1, wherein the two control levers are arranged so as to diverge in an approximately V-shaped manner behind a rim of the steering wheel, and the second control lever is integrated into the foot region of the first control lever and is arranged so as to project out of said foot region.

3. The actuating device as claimed in claim 2, wherein the first control lever extends, by way of its free end comprising the gearshift paddle, behind the steering wheel rim and approximately as far as an inner edge of the steering wheel rim, and the free end of the second control lever extends behind the steering wheel rim and beyond the inner edge of the steering wheel rim.

4. The actuating device as claimed in claim 1, wherein the second control lever has, in the foot region, an angled bend with respect to the first control lever, and free ends of the two control levers are spaced apart from one another with a free movement space for relative movement of the second control lever with respect to the first control lever.

5. The actuating device as claimed in claim 1, wherein the second control lever is movable together with the first control lever.

6. The actuating device as claimed in claim 1, wherein the second control lever can be decoupled with respect to the first control lever.

7. The actuating device as claimed in claim 1, wherein the second control lever is not configured for performing gearshifts in the transmission.

8. A steering wheel assembly for a motor vehicle comprising:
 a steering wheel; and
 an actuating device having two control levers which are connected to and rotate conjointly with the steering wheel, wherein a first control lever of the two control levers is configured for performing gearshifts in a transmission and a second control lever of the two control levers is configured for switching functional elements of the vehicle, wherein the first control lever is configured as a gearshift paddle and is arranged above the second control lever for the functional elements, and the second control lever is connected to the first control lever so as to perform a relative movement with respect thereto in a foot region of the actuating device.

9. The steering wheel assembly as claimed in claim 8, wherein the second control lever is not configured for performing gearshifts in the transmission.

10. The steering wheel assembly as claimed in claim 8 further comprising another of said actuating device having two control levers, wherein said another actuating device is positioned on an opposite side of the steering wheel as said actuating device.

* * * * *